US010823875B2

(12) United States Patent
Shestakova et al.

(10) Patent No.: US 10,823,875 B2
(45) Date of Patent: Nov. 3, 2020

(54) SCINTILLATOR PACKAGING FOR OILFIELD USE

(71) Applicant: Schlumberger Technology Corporation, Sugar Land, TX (US)

(72) Inventors: Irina Shestakova, Princeton, NJ (US); Adam Headley, Moorestown, NJ (US); Olivier Philip, Ewing, NJ (US); Rakesh Patel, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/951,057

(22) Filed: Nov. 24, 2015

(65) Prior Publication Data

US 2017/0146683 A1    May 25, 2017

(51) Int. Cl.
*G01V 5/08*    (2006.01)
*G01T 1/202*   (2006.01)
*G01T 1/20*    (2006.01)

(52) U.S. Cl.
CPC ................ *G01V 5/08* (2013.01); *G01T 1/202* (2013.01); *G01T 1/2002* (2013.01)

(58) Field of Classification Search
CPC .............................. G01T 1/202; G01T 1/2002
USPC ...................................................... 250/269.1
See application file for complete search history.

(56) References Cited

U.S. PATENT DOCUMENTS

| | | | | |
|---|---|---|---|---|
| 3,944,832 A | * | 3/1976 | Kalish | G01T 1/202 250/361 R |
| 4,631,409 A | * | 12/1986 | Sparacia | G01T 1/2002 250/361 R |
| 5,208,460 A | * | 5/1993 | Rougeot | G01T 1/2002 250/366 |
| 5,276,328 A | | 1/1994 | Yoshida et al. | |
| 5,753,918 A | * | 5/1998 | Pandelisev | G01T 1/2002 250/269.1 |
| 7,772,558 B1 | * | 8/2010 | Nagarkar | G01T 1/20 250/361 R |
| 8,604,416 B2 | * | 12/2013 | Fruehauf | G01T 1/00 250/261 |
| 8,779,352 B2 | | 7/2014 | Philip | |

(Continued)

FOREIGN PATENT DOCUMENTS

WO    WO 2014180658 A1 *  11/2014  ........... G01T 1/2018

OTHER PUBLICATIONS

Author: Solvay, Title: Torlon—technical data sheet, Date: Mar. 25, 2011, Publisher: Solvay specialty Polymers.*

(Continued)

*Primary Examiner* — Taeho Jo
(74) *Attorney, Agent, or Firm* — Trevor G. Grove

(57) ABSTRACT

A scintillator package includes a scintillator crystal, a first reflector layer directly surrounding a first area of a surface of the scintillator crystal, wherein the first reflector layer comprises a diffuse reflector, a second reflector layer directly over the first reflector layer, wherein the second reflector layer comprises a metal, and a package housing directly over the second reflector layer, wherein the package housing comprises a polymer with a reinforcing material, wherein the package housing is configured to optically expose a second area of the surface of the scintillator crystal.

18 Claims, 9 Drawing Sheets

(56) References Cited

U.S. PATENT DOCUMENTS

| | | | | |
|---|---|---|---|---|
| 9,018,591 | B2* | 4/2015 | Herr | G01T 1/20 175/41 |
| 9,377,542 | B1* | 6/2016 | Nagarkar | G01T 1/2018 |
| 2003/0209671 | A1* | 11/2003 | Frederick | G01V 5/04 250/363.01 |
| 2008/0156993 | A1* | 7/2008 | Weinberg | A61B 6/037 250/363.03 |
| 2009/0236534 | A1 | 9/2009 | Selfe et al. | |
| 2009/0261253 | A1* | 10/2009 | Menge | G01V 5/04 250/361 R |
| 2009/0261262 | A1* | 10/2009 | Hunt | G01T 1/2002 250/370.11 |
| 2009/0283687 | A1* | 11/2009 | Menge | G01T 1/20 250/370.11 |
| 2010/0090111 | A1* | 4/2010 | Stoller | G01T 1/202 250/337 |
| 2010/0155610 | A1* | 6/2010 | Menge | G01T 1/00 250/368 |
| 2010/0276600 | A1* | 11/2010 | Ronda | G01T 1/2018 250/362 |
| 2011/0017911 | A1* | 1/2011 | Flamanc | C09K 11/02 250/361 R |
| 2011/0017916 | A1* | 1/2011 | Schulz | G01T 1/202 250/368 |
| 2011/0121187 | A1* | 5/2011 | Frank | G01T 1/20 250/368 |
| 2012/0025074 | A1* | 2/2012 | Barbi | G01N 23/2257 250/307 |
| 2012/0186061 | A1* | 7/2012 | Simonetti | C30B 11/00 29/428 |
| 2012/0187081 | A1* | 7/2012 | Philip | G01T 1/2002 216/24 |
| 2012/0193539 | A1* | 8/2012 | Bizarri | C09K 11/7733 250/361 R |
| 2012/0228472 | A1* | 9/2012 | Simonetti | G01T 1/202 250/207 |
| 2012/0241637 | A1* | 9/2012 | Simonetti | G01T 1/20 250/390.11 |
| 2013/0075617 | A1* | 3/2013 | Simonetti | G01T 1/202 250/361 R |
| 2014/0084150 | A1* | 3/2014 | Stephenson | G01T 1/20 250/269.1 |
| 2014/0091214 | A1* | 4/2014 | Philip | G01T 1/20 250/269.1 |
| 2014/0339408 | A1* | 11/2014 | Ziegler | G01T 1/2018 250/256 |
| 2014/0339409 | A1* | 11/2014 | Stephenson | G01T 1/2006 250/256 |
| 2015/0014544 | A1* | 1/2015 | Stephenson | H01J 40/18 250/361 R |
| 2015/0185336 | A1* | 7/2015 | Stoller | G01T 1/20 250/256 |
| 2015/0268375 | A1 | 9/2015 | Kubat et al. | |
| 2016/0109587 | A1* | 4/2016 | Wieczorek | G01T 1/2018 250/362 |
| 2016/0138383 | A1* | 5/2016 | Molodetsky | E21B 47/00 264/621 |
| 2016/0170043 | A1* | 6/2016 | Andreaco | G01T 1/2002 250/368 |
| 2016/0209517 | A1* | 7/2016 | Cooke | H01L 27/14685 |
| 2017/0343682 | A1 | 11/2017 | Shestakova et al. | |

OTHER PUBLICATIONS

Author: Gore, Title: DRP® Reflectors, Date: 1999, Publisher: W. L. Gore & Associates, Inc.*

Martin Janecek: "Reflectivity Spectra for Commonly used Reflectors", IEEE Translations on Nuclear Science, IEEE Service Center, New York, NY, US, vol. 59, No. 3, Jun. 1, 2012, pp. 490-497.

Extended Search Report issued in the related EP Application 16199791.1, dated Mar. 27, 2017 (9 pages).

* cited by examiner

SCINTILLATOR PACKAGING FOR OILFIELD USE

BACKGROUND

This disclosure relates generally to scintillation detectors, and more particularly, to packaging of scintillation detectors to increase light output efficiency, improve stability, and reduce aging progress, especially under the inclement environmental conditions encountered during downhole drilling or logging operations.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Scintillation detectors are employed in a variety of settings to detect radiation. In the presence of ionizing radiation, a scintillator crystal may produce detectable wavelengths of light. A light detection device, such as a photomultiplier tube, may convert this light into an electrical signal. Thereafter, the electrical signal may be analyzed to determine an amount of detected radiation. In an oilfield setting, scintillation detectors may be used in downhole tools that are moved into a well drilled into a geological formation. The scintillation detectors may be used to identify the manner in which certain radiation—whether naturally occurring in the geological formation or emitted into the geological formation by a radiation source in the downhole tool—interacts with materials that make up the geological formation or the fluid in the well. The amount of radiation detected by the scintillation detector thus may correspond to properties of the geological formation. In this way, scintillation detectors may assist in the indirect determination of properties of a geological formation or a well drilled into a geological formation.

When scintillation detectors are employed for downhole well-logging, the scintillator crystals of the scintillation detectors may be subject to rapid increases or decreases in temperature going to heat from the surrounding geological formation. Additionally, the scintillator crystals may be subject to mechanical shock and other stresses. Many of the scintillator crystals may also be hygroscopic, and therefore sensitive moisture or other gas contaminants such as oxygen. As a result, many scintillator packages that contain the scintillator crystals are self-contained hermetic enclosures. These hermetically sealed scintillator packages may have an optical window that is coupled to a metal housing that provides a sealed enclosure as well as support. The hermetically sealed scintillator packages, however, may take up a substantial amount of space, and may also hamper light transition through the use of the optical window. Furthermore, the metal housing may be too heavy for certain package shock specifications in certain oil field settings.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a scintillator package includes a scintillator crystal, a first reflector layer directly surrounding a first area of a surface of the scintillator crystal, wherein the first reflector layer comprises a diffuse reflector, a second reflector layer directly over the first reflector layer, wherein the second reflector layer comprises a metal, and a package housing directly over the second reflector layer, wherein the package housing comprises a polymer with a reinforcing material, wherein the package housing is configured to optically expose a second area of the surface of the scintillator crystal.

In one embodiment, a downhole tool includes a radiation source to emit radiation into a geological formation around the downhole tool and a radiation detector to detect a signal from the irradiated geological formation. The radiation detector comprises a scintillator package. The scintillation package comprises a scintillator crystal, a first reflector layer directly surrounding a first area of a surface of the scintillator crystal, wherein the first reflector layer comprises a diffuse reflector, a second reflector layer directly over the first reflector layer, wherein the second reflector layer comprises a metal, and a package housing directly over the second reflector layer, wherein the package housing comprises a polymer with a reinforcing material, wherein the package housing is configured to optically expose a second area of the surface of the scintillator crystal.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
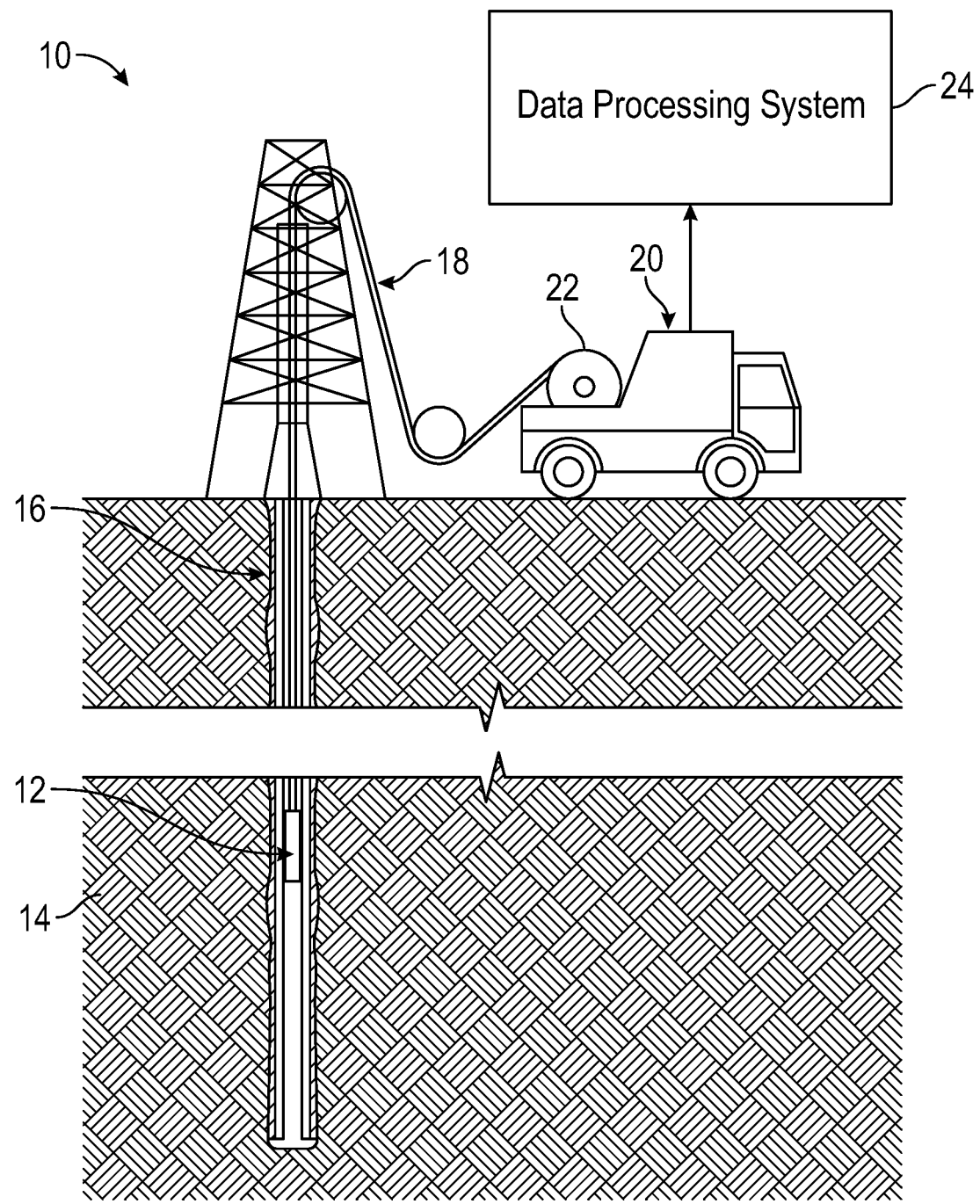
FIG. 1 is a schematic drawing of a well-logging system that employs a downhole tool housing a scintillator package of this disclosure, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Scintillator detectors are used to detect ionizing radiation, such as x-rays, gamma-rays, and/or neutrons, in downhole tools used in oilfield settings. This disclosure describes a scintillator detector that uses a non-reactive scintillator crystal. In some embodiment, such non-reactive scintillator crystal is non-hygroscopic. Non-reactive and/or non-hygroscopic scintillator detectors may be less sensitive to moisture or oxygen and, accordingly, the scintillator detector packaging of this disclosure may not provide a hermetic seal around the non-hygroscopic scintillator crystal. The scintillator packaging of this disclosure may provide improvements in performance by eliminating the optical window and hermetic housing that might otherwise be found in a hygroscopic scintillator package.

In some cases, the non-hygroscopic scintillator packaging of this disclosure may provide at least a two-fold improvement in performance. The first performance improvement may include increased light transmission between the scintillator crystal and a photodetective device such as a photomultiplier tube, since the scintillator crystal can be coupled directly to the photo detector without an optical window that would absorb some of the light. The second performance improvement may include increases in efficiency because the scintillator crystal can be physically larger in volume, since less packaging may be employed. This may improve nuclear performance, which is also referred to as detection efficiency.

Although the scintillator packaging of this disclosure may eliminate some of the bulky leak-tight packaging, the packaging of this disclosure may still protect the fragile scintillator crystal by securing the scintillator crystal in the packaging. Additionally, the scintillator packaging of this disclosure may reduce the size of the total envelope to allow for an increase in the relative volume of the scintillator crystal in the scintillator crystal packaging. The scintillator packaging may have properties of comparatively high strength as well as the ability to expand uniformly with its surroundings so as not to create a condition where the packaging causes excessive compression or clearance with changes in temperature.

With this in mind, the packaging of this disclosure may fulfill the following functions: 1) provide an enhancement of the nuclear performance using surface finishing techniques and scintillation light reflector (film and/or sheet) application; 2) provide mechanical support for the fragile scintillator crystal; 3) protect the integrity of the reflector from contamination and mechanical damage, while securing it in its place; 4) provide insulation from thermal shocks; 5) be well-matched to the thermal expansion properties of the scintillator crystal, detector housing, and overall downhole tool housing; and 6) be lightweight for good shock and vibration performance. Additionally, the package may survive high temperatures found in the downhole environment that the downhole tool maybe used in.

FIG. 1 illustrates a well-logging system 10 that may employ the scintillator detector packaging systems and methods of this disclosure. The well-logging system 10 may be used to convey a downhole tool 12 that includes such scintillator detectors through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22.

Moreover, although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that detects radiation using a scintillator detector in the packaging of this disclosure.

The downhole tool 12 may provide radiation measurements (e.g., counts of detected gamma-rays or x-rays) to a data processing system 24 via any suitable telemetry (e.g., via electrical signals pulsed through the geological formation 14 or via mud pulse telemetry). The data processing system 24 may process the radiation measurements to identify certain properties of the wellbore 16 (e.g., porosity, permeability, relative proportions of water and hydrocarbons, and so forth) that may be otherwise indiscernible by a human operator.

By way of example, the data processing system 24 may include a processor, which may execute instructions stored in memory and/or storage. As such, the memory and/or the storage of the data processing system 24 may be any suitable article of manufacture that can store the instructions. The memory and/or the storage may be ROM memory, random-access memory (RAM), flash memory, an optical storage medium, or a hard disk drive, to name a few examples. A display, which may be any suitable electronic display, may provide a visualization, a well log, or other indication of properties of the wellbore 16.

Figure 2:
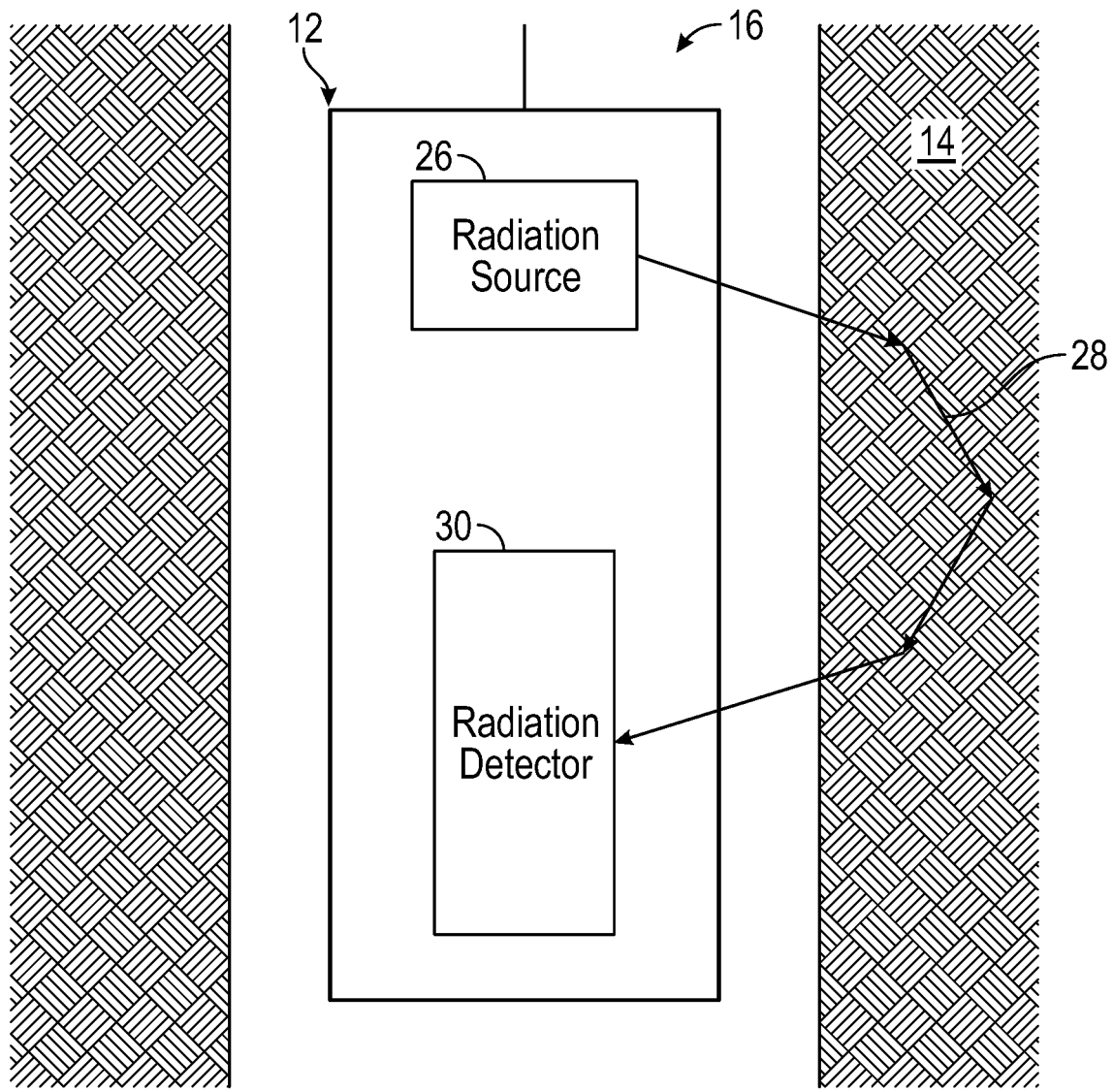
FIG. 2 is a block diagram of one example of the downhole tool.

One example of the downhole tool 12 is shown in FIG. 2. The downhole tool 12 may include a radiation source 26 to emit radiation 28 into the geological formation 14. The radiation source may include, for example, a radioisotopic gamma-ray source (e.g., Cs or Am) or an electronic x-ray generator, and/or a radio isotopic or electronic neutron-generator. The radiation source 26 emits radiation 28 out of the downhole tool 12. For example, the radiation 28 may enter the geological formation 14, where it may scatter or collide with atoms of the geological formation 14 to generate other radiation that may scatter. Some of the radiation 28 or radiation that results from interactions with the radiation 28 in the geological formation 14 may scatter and return to the downhole tool 12 to be detected by a radiation detector 30. In general, the radiation detector 30 may detect when izoning radiation enters the downhole tool 12 and generate an electrical signal, such as a count rate of detected radiation or spectrum of detected radiation that may provide an indication of characteristics of the wellbore 16 or the geological formation 14.

Figure 3:
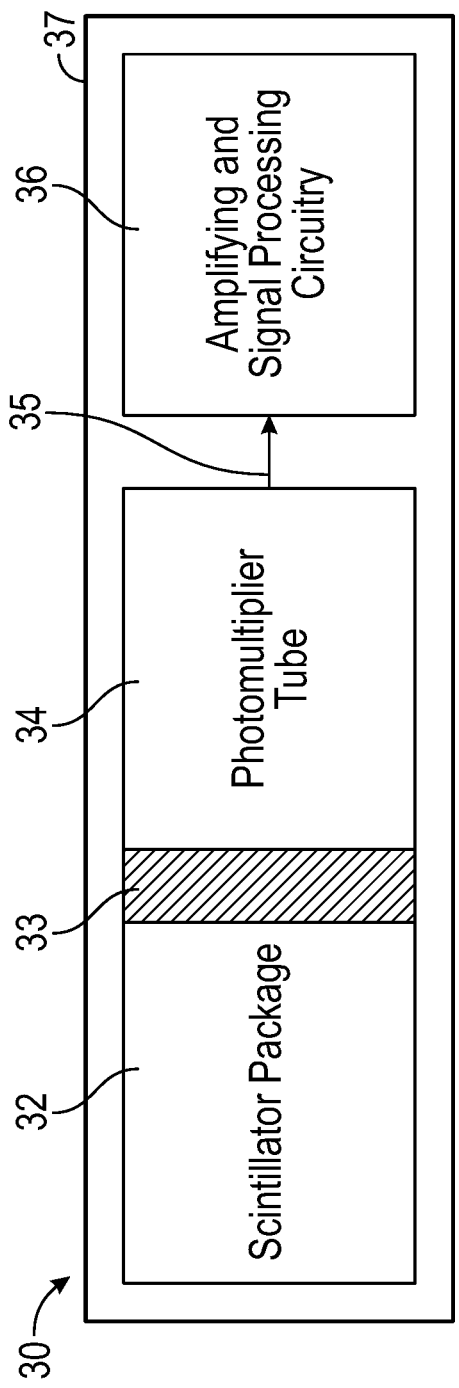
FIG. 3 is a block diagram of a radiation detector that includes the scintillator package, in accordance with an embodiment.

The radiation detector 30 is shown in block diagram format in FIG. 3. The radiation detector 30 may include a scintillator package 32 that houses a scintillator crystal that scintillates—that is, that emits light in a detectable wavelength-when struck by ionizing radiation. As will be discussed below, the scintillator package 32 also includes materials to increase the amount of light that is emitted by the scintillator crystal that pass through an optical coupling 33 (e.g., transparent silicone elastomer, which is stable at high temperature) into a photodetector such as a photomultiplier tube 34. Because the scintillator package 32 may use a non-hygroscopic scintillator crystal, the optical coupling 33 may avoid using an optical window that could prevent some of the light from entering the photomultiplier tube 34. The photomultiplier tube 34 generates an electrical signal 35 depending on the amount of light it receives from the scintillator package 32. As a result, the electrical signal 35 output by the photomultiplier tube 34 is related to the amount of radiation detected in the scintillator package 32. Amplifying and/or signal processing circuitry 36 may receive the electrical signal 35 and perform any suitable signal processing on the signal before outputting it for further analysis by the data processing system 24. The elements of the radiation detector 30 may be held in a housing 37 and/or the elements of the radiation detector 30 may be encased (without the housing 37) in a housing of the downhole tool 12. The housing 37 or the housing of the downhole tool 12 may be formed from any suitable materials. In one example, the housing 37 or the housing of the downhole tool 12 may be formed using stainless steel 316, which has an expansion coefficient of about 16 ppm/° K.

Figure 4:
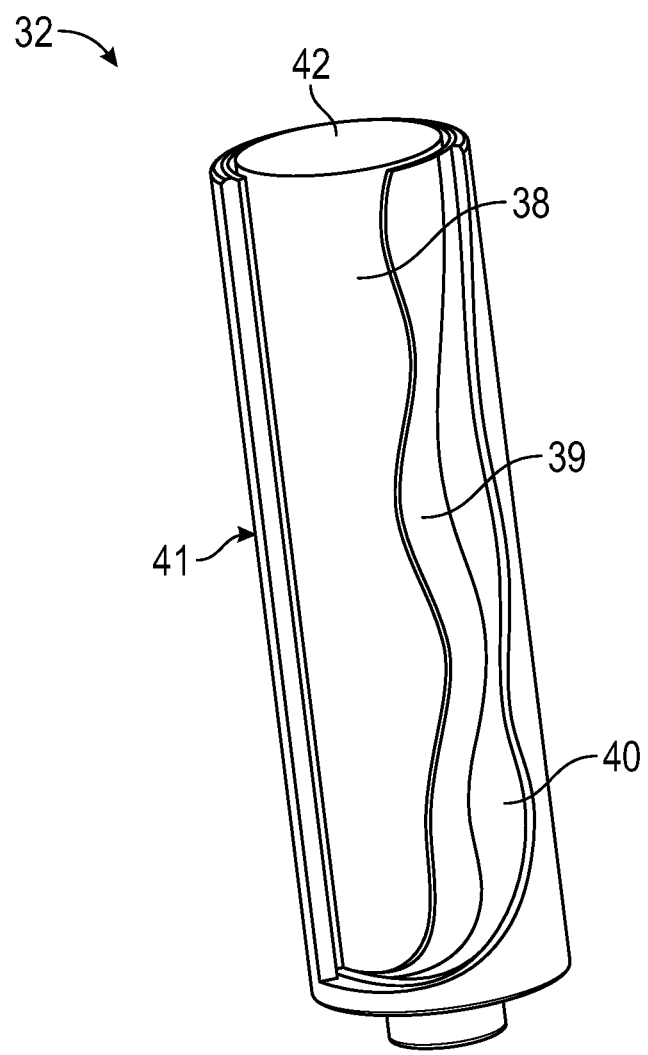
FIG. 4 is a perspective view of the scintillator package, in accordance with an embodiment.

FIG. 4 illustrates a perspective view of the scintillator package 32. Encased in the scintillator package 32 is a non-hygroscopic scintillator crystal 38. Any suitable non-hygroscopic scintillator crystal 38 may be used, including YAP(Ce). Various properties of YAP(Ce) are shown in the following table, in comparison to other scintillator choices that may be used in oilfield applications:

TABLE 1

| Property | NaI(Tl) | LaBr3(Ce) | YAP(Ce) |
| --- | --- | --- | --- |
| Density (gcc) | 3.67 | 5.08 | 5.55 |
| Refraction Index | 1.85 | 1.9 | 1.95 |

TABLE 1-continued

| Property | NaI(Tl) | LaBr3(Ce) | YAP(Ce) |
| --- | --- | --- | --- |
| Hardness (MPa) | 80 | 415 | 9800 |
| Fracture Toughness (MPa/m$^{1/2}$) | 0.40 | 0.16 | 2.57 |
| Fracture strength | 17 | 23 | 237 |
| Temperature stability (light output loss 25 C.-175 C. | −30% | −8% | −5% |

As seen in Table 1, the extreme ruggedness of YAP makes it an excellent choice for high-shock high-temperature environments, such as those of an oilfield well. To increase the light output and energy resolution of the scintillator crystal 38, the YAP(Ce) scintillator crystal 38 may have a surface finish as described further below with reference to FIGS. 7-12.

One or more layers of diffuse reflector 39 may be applied around the scintillator crystal 38, which may be followed by a secondary reflector layer 40. A package housing 41 may extend around the secondary reflector layer 40. The package housing 41 may be formed using a reinforced polymer, such as polyamide-imide (PAI) with between about 20% and 40% glass fill (e.g., 30% glass fill, as found in Torlon 5030).

The diffuse reflector 39 may include, for example, a layer of Gore® Diffuse Reflector Product (Gore® DRP). In one example, a 0.5 mm thickness is used, though any other suitable thicknesses may also be used. Indeed, in some embodiments, the thickness of the diffuse reflector 39 may be less than or equal to about 1 mm, or less than or equal to about 3.5 mm. It may be appreciated that the reflective properties of the Gore® Diffuse Reflector Product may be selected to be relatively thin, since the YAP peak emission wavelength is 385 nm, and 0.5 mm thick Gore® Diffuse Reflector Product may be substantially as reflective as thicker layers of Gore® Diffuse Reflector Product.

Figure 5:
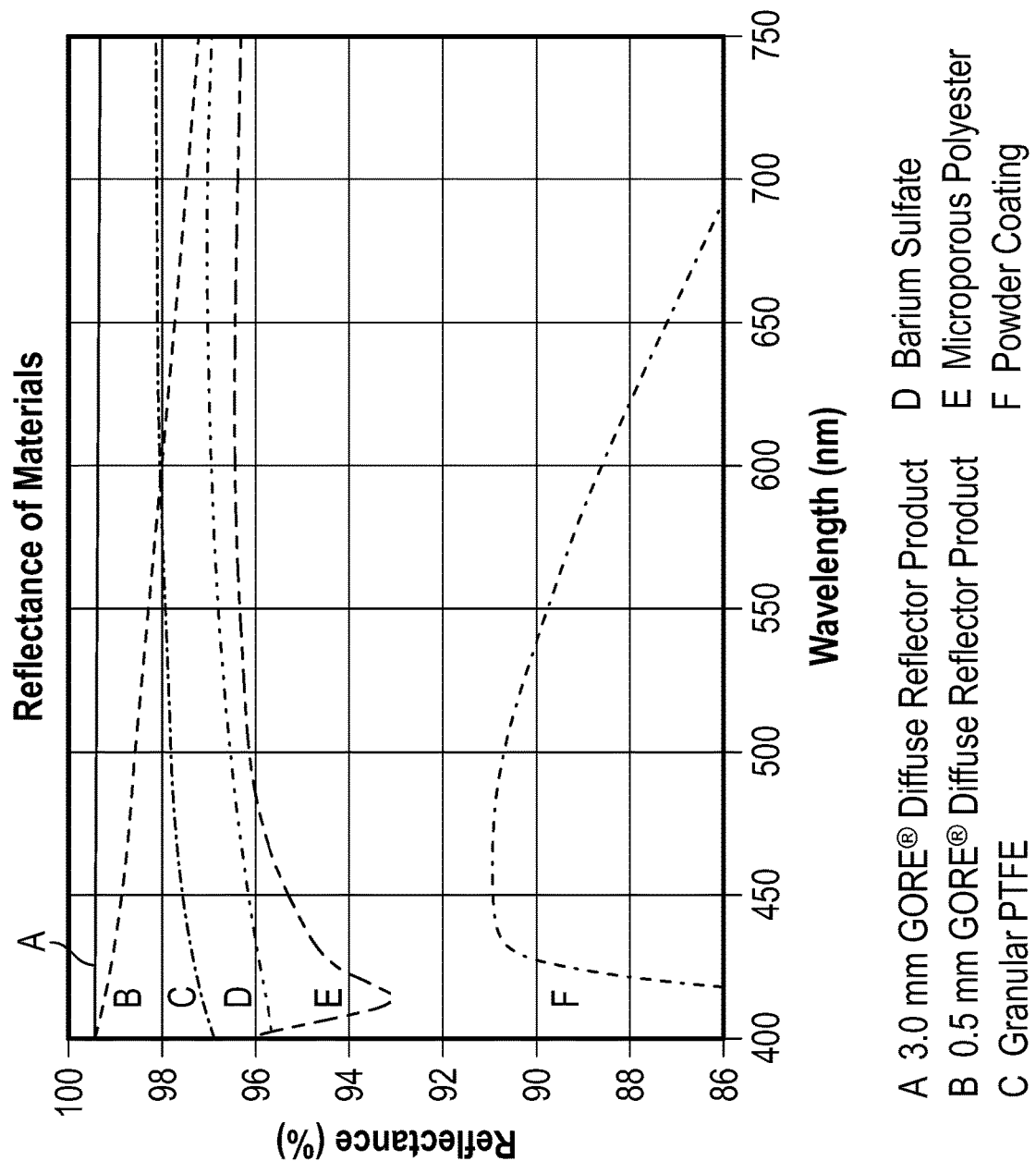
FIG. 5 is a plot illustrating a reflectance of materials that may be used as a diffuse reflector in the scintillator package, in accordance with an embodiment

Indeed, turning briefly to FIG. 5, the reflectance of materials in comparison to light wavelength, 3.5 mm Gore® Diffuse Reflector Product have substantially the same amount of reflectance at 400 mm, which is close to the peak emission wavelength of YAP, 385 mm. Additionally or alternatively, granular polytetrafluoroethylene (PTFE), barium sulfate, or microporous polyester may be used as the diffuse reflector 39. Additionally or alternatively to the Gore® Diffuse Reflector Product, the diffuse reflector 39 may include a thin film of aluminum (which may include a layer of magnesium fluoride to add thermal stability). An example may include $MgF_2$+Al reflective coating or $MgF_2$+Al+$MgF_2$ reflective coating.

Referring again to FIG. 4, the secondary reflector layer 40 may provide additional improvements in light output (e.g., pulse height). For example, the secondary reflector layer 40 may be a layer of high-vacuum-rated aluminum foil on top of the diffuse reflector 39. This may provide about 5% improvement in light output in comparison to providing two layers of Gore® Diffuse Reflector Product (0.5 mm thickness) alone in the diffuse reflector 39. Furthermore, the temperature stability of the reflector has been tested measuring light output from gamma-rays detected by the scintillator crystal 38 having an energy of 662 keV energy resolution from cesium (Cs) while heating the package scintillator crystal 38 from 25° C. to 200° C., with only a 5% degradation in light output. Furthermore, the performance of the use of Gore® Diffuse Reflector Product (0.5 mm thick) has been identified as stable despite aging, by exposing the packaged YAP scintillator to 400 hours of 200° C. temperature with no degradation identified at the end of the aging. The reflector layers 39 and/or 40 may be pre-baked to pre-shrink and/or pre-age the scintillator package 32 to increase the stability of the performance of the scintillator detector 30. The reflector layers 39 and/or 40 may be pre-baked, for example, at a temperature of approximately 200° C. approximately 8-12 hours before integration into the scintillator package 32.

As noted above, the package housing 41 may be formed using a reinforced polymer. This may be contrasted with metal packages. As mentioned above, metal packages would possess some of the desired properties for stability and withstanding mechanical shocks, but may fail to meet other desired properties such as reduced weight or providing thermal insulation. As such, the packaged housing 41 may be formed using a high-temperature polymer that includes reinforcing materials such as glass or carbon fibers. Indeed, a high-temperature polymer may be a good choice, as it is lightweight and provides good thermal isolation. However, a high coefficient of thermal expansion may pose an issue, as the package may expand at a different rate than the scintillator crystal 38 and the surrounding housing. Additionally, a polymer by itself may not possess as much strength. To meet these demands, the package housing 41 may be a combination of a polymer with a reinforcing material. In one embodiment, the reinforcing material comprises of glass or carbon. Examples include, but are not limited to, glass fibers, carbon fibers, carbon nanotubes, and the like. The reinforcing material may also be a boron carbide material enriched with elements such as Gd, Cd or Li. In addition to the fibrous form, the reinforcing material may also take the form of platelets, ribbons, balls, spheres, etc., for example glass beads and microspheres. The reinforcing material allows the property of the final packaging material to be tailored to meet the particular specifications of the oilfield application. For example, the properties that may be particularly desirable of the polymer are its low weight and low thermal conductivity. The properties of reinforcing glass material that may be desirable include its high tensile strength, and low thermal expansion coefficient. By combining the two materials together, the resulting composite may be strong, lightweight, and may have a low coefficient of thermal expansion and thermal conductivity.

One reinforced polymer that may be used is Torlon 5030, which is PolyAmide-Imide (PAI) with 30% glass fill. The expansion coefficient of Torlon 5030 may be 16 ppm/° K. In comparison to the scintillator crystal 38 that it houses, of which YAP is for 4-11 ppm/° K, and stainless steel 316, which is an often-used downhole material, which is 16 ppm/° K, the Torlon 5030 is closely matched. The close match between the PAI with 30% glass fill of the Torlon 5030 to the stainless steel housing and the scintillator crystal 38 may help maintain certain specified downhole tolerances over a wide range of temperatures. Other reinforced polymers may be used, such as PolyEtherEtherKetone (PEEK) with approximately 20%-40% (e.g., 30%) glass fill. It may be appreciated, however, that Torlon 5030 may have a higher temperature service limit and stability. Additionally or alternatively, aluminum may be used in the package housing 41. Aluminum, however, has nearly three orders of magnitude higher thermal conductivity and the expansion coefficient of aluminum (23 ppm/° K) is higher than that of Torlon 5030. Moreover, aluminum is twice as dense as some reinforced polymers, such as Torlon 5030, which would increase the weight of the scintillator package 32.

Since the scintillator crystal 38 is non-reactive/non-hygroscopic, a front face 42 of the scintillator crystal 38 may be at least partially exposed out of the package housing 41. This may allow the front face 42 of the scintillator crystal 38 to be optically coupled directly to the photomultiplier tube 34 via the optical coupling 33 (e.g., transparent silicone elastomer, silicone grease and/or an anti-reflective coating applied to the scintillator crystal 38) without using an optical window, the use of which might absorb some light produced by the scintillator crystal 38. By avoiding the use of an optical window between the scintillator crystal 38 and the photomultiplier 34, the scintillator package 32 may increase the efficiency of the scintillator detector 30 in relation to a scintillator detector having a scintillator package that included an optical window.

Figure 6:
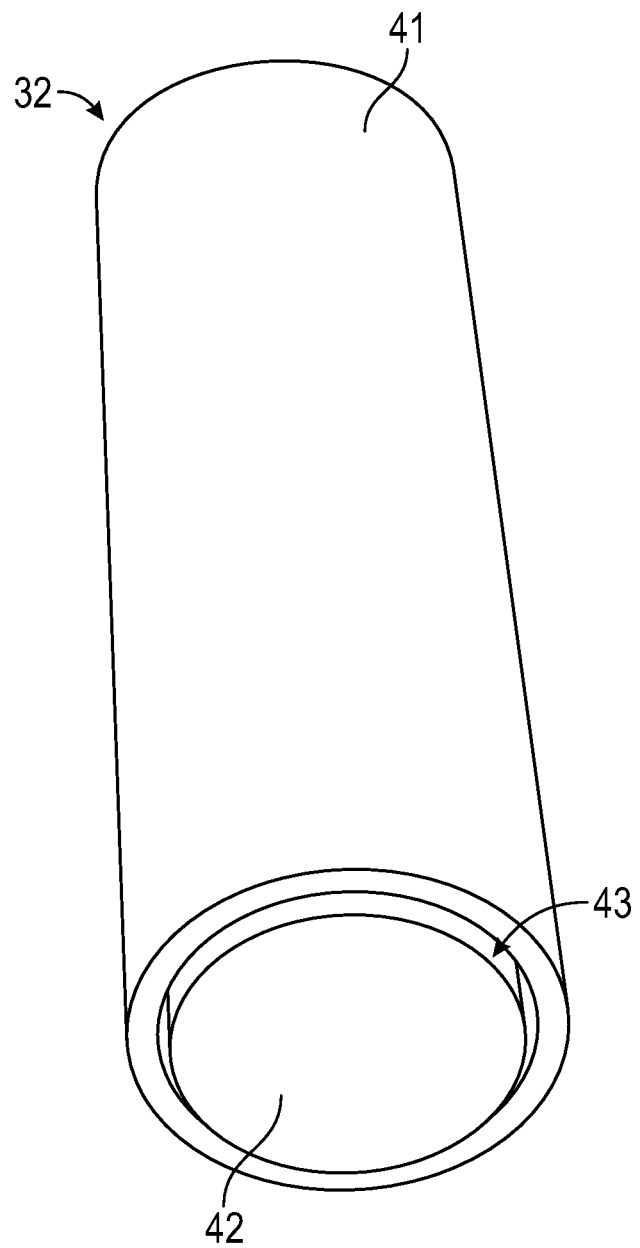
FIG. 6 is another perspective view of the scintillator package showing a sealant applied around the front face of a scintillator crystal held by the scintillator package, in accordance with an embodiment.

As illustrated in FIG. 6, a sealant (e.g., a room temperature vulcanization (RTV) sealant) may be applied around the gap between the scintillator crystal 38 and the package housing 41. The sealant can be clear or colored, depending on the intended use or specification. This seal may serve as a barrier between the outside environment and the diffuse reflector layer 39 and the secondary reflector layer 40, preventing contaminants such as optical grease or dust from affecting the reflective properties of these materials. It may be appreciated that an anti-reflective coating may be applied to the front face 42 of the scintillator crystal 38. The anti-reflective coating applied to the front face 42 of the scintillator crystal 38 may be selected to better match an index of refraction of the scintillator crystal 38 (e.g., YAP) to that of the silicone grease that may be used to couple the front face of the scintillator crystal 38 to the photomultiplier tube 42.

To increase light collection, the surface of the scintillator crystal 38 (which may also be referred to below as the surface of the scintillator body) may not be kept smooth. More particularly, the surface of the scintillator crystal 38 may be modified, such as by scratching with abrasives in a direction at least partly defined by the alignment of the scintillator crystal 38 and the photomultiplier tube 34 (i.e., along the axis of the scintillator crystal 38 or other suitable direction). This process may be referred to as optical compensation.

As noted above, the scintillator crystal 38 may be subjected to mechanical stress when packaged into the radiation detector 30, especially for use in harsh environments such as wellbore applications. For example, the scintillator crystal 38 may be packaged under axial and/or radial compression to prevent movement resulting from shocks and vibrations. The scintillator crystal 38 may also be subjected to mechanical stress from shock propagation and thermal stress when ramping up or down in temperature. As a result of such stresses, optical compensation with scratches as described in this disclosure may avoid coinciding with the weakest mechanical direction in the scintillator crystal 38, and/or a potentially mechanically weak area where the sidewall meets the end face of the scintillator crystal 38. Indeed, the optical compensation that may be further applied to the scintillator crystal 38 as discussed below may generally avoid creating defects reaching the edges of the scintillator crystal 38 where mechanical stress from packaging may occur, thereby lowering a probability of fracturing the scintillator crystal 38 during operation in harsh environments.

More particularly, when the scintillator crystal 38 is subjected to excessive stress, a fracture may be initiated. The point of initiation is located where the level of local stress is greater than the strength of the scintillator crystal 38 in that location. The compensation scratches at the surface of the scintillator crystal 38 could produce points where cracks are more likely to start. Additionally, some types of scintillator crystals are anisotropic, meaning that their physical properties are different in different directions. A consequence of anisotropy is that the mechanical properties of the scintillator crystal 38 may be very different in different directions and present cleavage planes where the structural weakness is greatest. When cleavage planes are oriented along the same direction as the one to be used for optical compensation (in the case of a cylindrical crystal, along the scintillator crystal 38 axis), the result is that the weakness generated by the compensation scratch at the surface of the scintillator crystal 38 compounds the weakness along the cleavage plane, creating a very weak mechanical area where fractures are most likely to start. Other weak mechanical areas are edges of the scintillator crystal 38 where external stress from compression or shocks may be applied. YAP may be understood to have a rhomboid crystalline structure, so this may be taken into consideration when generating scratches on the outer surface of the scintillator crystal 38.

Figure 7:
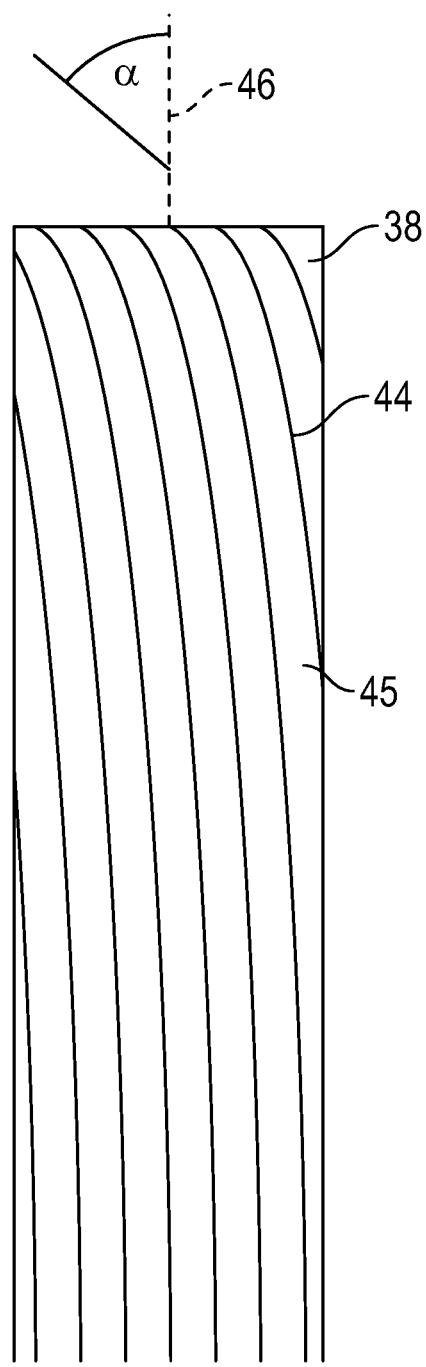
FIG. 7 is a schematic view of a pattern of scratches that may be formed on the surface of the scintillator crystal, in accordance with an embodiment.

As shown in FIG. 7, to help reduce the potential for defects and fracturing, while still providing desired optical compensation, the scintillator crystal 38 may include a number of surface scratches 44 that spiral or curve around the exterior surface of the scintillator body to define corresponding surface ridges or protrusions 45 therebetween (which also spiral around the exterior surface). By way of example, the compensation direction of spiraling may be slightly offset at an angle $\alpha$ relative to a crystal axis 46 (and/or cleavage plane(s)) of the scintillator crystal 38. In one example, a desired reduction of defects and/or fracturing may occur with the angle $\alpha$ being greater than five degrees. Generally speaking, the greater the angle, the greater the reduction in defects and/or fractures, but the lower the light collection will be, so the angle may be chosen differently in different examples depending upon the various stress and collection efficiency constraints of a given application.

With respect to a depth of the surface scratches 44, the depth may be selected based upon the type of scintillator material being used. For example, for materials that are more prone to fracture and where stress needs to be reduced, the scratch depth may be relatively small, such as up to about 10 microns. For materials that are less prone to fracture, the scratch depth may be increased, e.g., up to about 200 microns. Furthermore, various entry angles may also be used for the surface scratches 44. The scratch entry angle will in part depend on the abrasive used. Generally speaking, sharper entry angles may provide improved optical results, and the sharper angles may be obtained with sharper abrasives (e.g., diamond-based abrasives). Considering the distribution of facet angles on the scintillator crystal 38 surface, it may generally be desired to increase the probability of facets above 30 degrees, such as to around 60 degrees. However, it should be noted that the depth and entry angle of the scratches 44 may not be considered as absolute numbers but rather distributions and other values besides the example values given above may also be used.

The angular offset of the surface scratches 44 helps reduce the places where surface compensation defects, crystal structural weaknesses and direction of outside applied stress coincide. With some scintillator materials, a cleavage plane may be located along the scintillator crystal 38 axis 46. In these cases, creating compensation scratches along the scintillator crystal 38 but with a slight rotation angle $\alpha$ helps avoid creating scratches coinciding with a cleavage plane, and increases the mechanical strength of the compensated scintillator crystal 38. The surface scratches 44 may accordingly intersect the cleavage plane, but will not run along the plane. Moreover, during thermal changes, contraction or expansion of the scintillator crystal 38 may create tensile stress at the surface along the scintillator crystal 38 axis 46. Since the spiral surface scratches 44 do not run along the scintillator crystal 38 axis 46, this also helps reduce the chances of fracture initiation from thermal changes.

The surface scratches 32 may be formed using diamond abrasives between 10 and 40 microns in size which are applied to the exterior surface of the scintillator crystal 38 while it is rotated about the axis 46, for example, although other types and sizes of abrasive particles may also be used. Moreover, the abrasive may also be rotated around the scintillator crystal 38. By way of reference, the scintillator crystal 38 may have a diameter of about one to two inches, and a length of about three to five inches in an example wellbore logging tool detector configuration, but different sizes may be used in different examples. The surface scratches 44 change the path of the light (photons) traveling inside of the scintillator crystal 38 to control the statistics of the length of their path, which is directly related to their probability of being either absorbed or detected. The surface scratches 44 may accordingly provide a more uniform and enhanced probability of photon detection, which results in enhanced detector performance.

Figure 8:
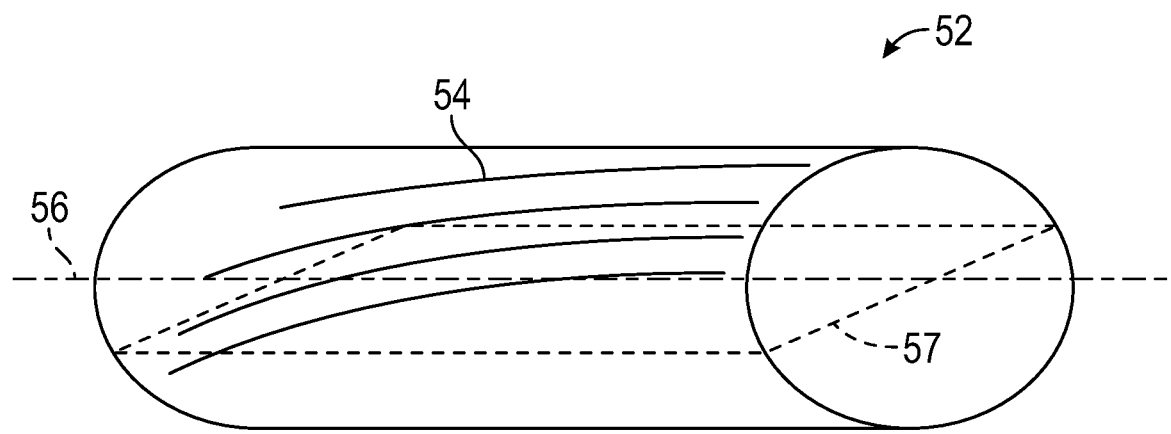
FIGS. 8-12 provide other examples of patterns of scratches that may be formed on the surface of the scintillator crystal, in accordance with embodiments.

In the example of FIG. 7, the scratches 44 extend all the way to both ends (i.e., edges) of the scintillator crystal 38. However, referring to another example of a scintillator body 52 shown in FIG. 8, some or all of the spiral scratches 54 may stop short of, or terminate before, the edges of the scintillator body 52. This may help further reduce the creation of defects adjacent the ends of the scintillator crystal 38, although the greater the gap between the edges and the scratches 54, the lower the collection will be as a result of the reduction in roughened exterior surface area. A crystal axis 56 and cleavage plane 57 are also shown in FIG. 8. By reducing the overlap between the optical compensation and the directions and/or areas of weakest mechanical strength, the probability of fracturing the scintillator body 52 during operation in harsh environments is further reduced. That is, ending the surface scratches 54 before they reach the edges of the scintillator body 52 also helps avoid adding a mechanical defect to a structurally weak part of the scintillator crystal 38, which further increases resilience to stress, especially when the scintillator crystal 38 is subjected to axial mechanical loading. By way of example, the surface scratches 54 may be terminated at least 1 mm before (i.e., away from) the edges of the scintillator body 52.

Figure 9:
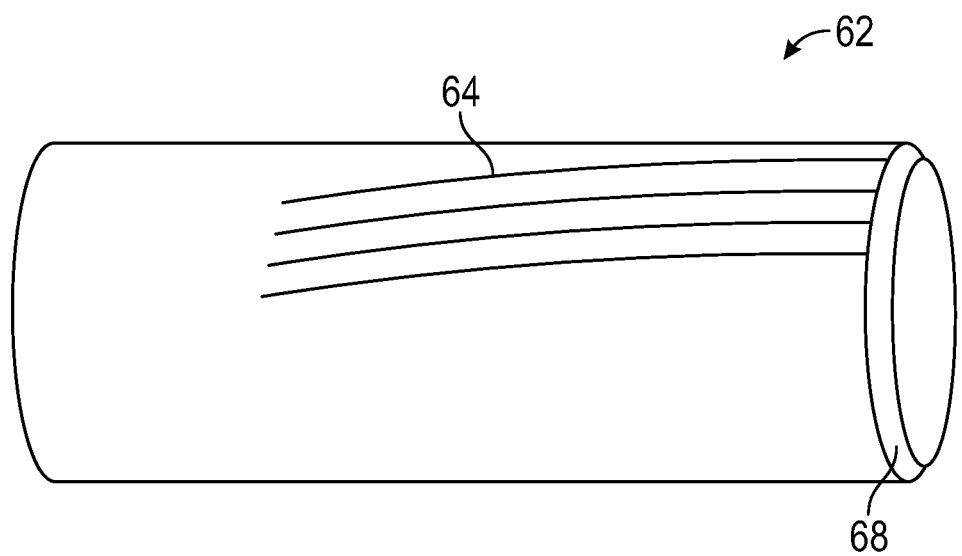

Still another approach to help alleviate defects adjacent the edges is provided by a scintillator body 62 shown in FIG. 9. Here, a small taper or chamfer 68 is provided on one or both of the edges of the scintillator body 62 so that the spiral scratches 64 do not extend to the ends of the scintillator body. That is, the taper 68 breaks off the 90° angle between the sidewall and the end surface, which may be a mechanically weak point where fractures may be initiated more easily. Yet, the taper 68 may be made relatively small to help avoid excessive trapping of light within the scintillator body 62 so that it can escape into the photodetector 38.

Figure 10:
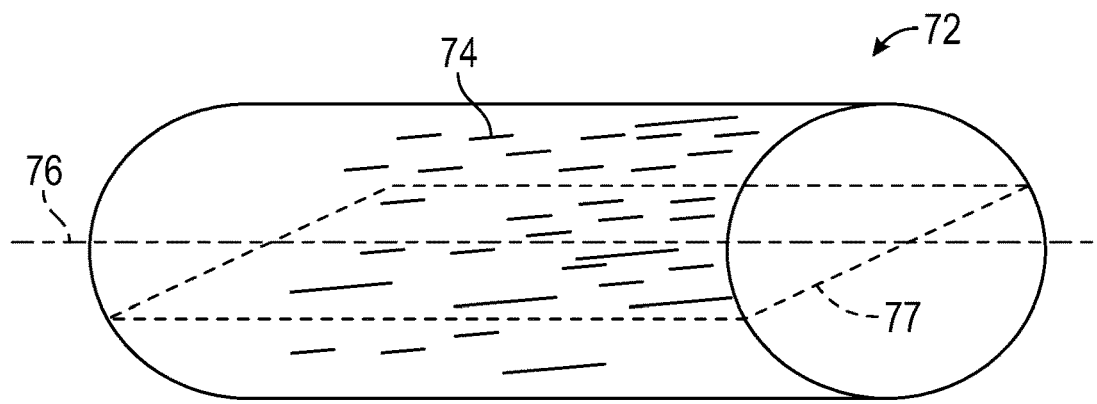
Figure 11:
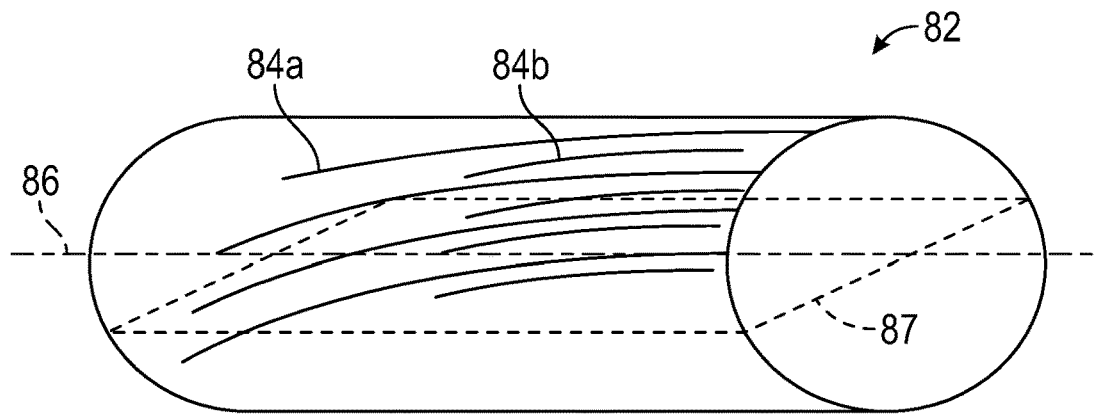

Still another example is shown in FIG. 10, in which a scintillator body 72 has a crystal axis 76 and cleavage plane 77. Here, the spiral surface scratches 44 are shortened or abbreviated, but are still angularly offset with respect to the scintillator crystal 38 axis 76.

Yet another example is shown in FIG. 1, in which a scintillator body 82 has a crystal axis 86 and cleavage plane 87. Here, a number of different spiral surface scratches 84 a, 84 b have respective different scratch densities. For example, a first scratching operation may be performed with a first abrasive size and/or application pressure, and then a second scratching operation may be performed with a different abrasive size and/or a different application pressure. A single scratching operation with a mix of abrasives of different sizes may also be performed to achieve this configuration. This may help customize the optical compensation for different applications, if desired.

Figure 12:
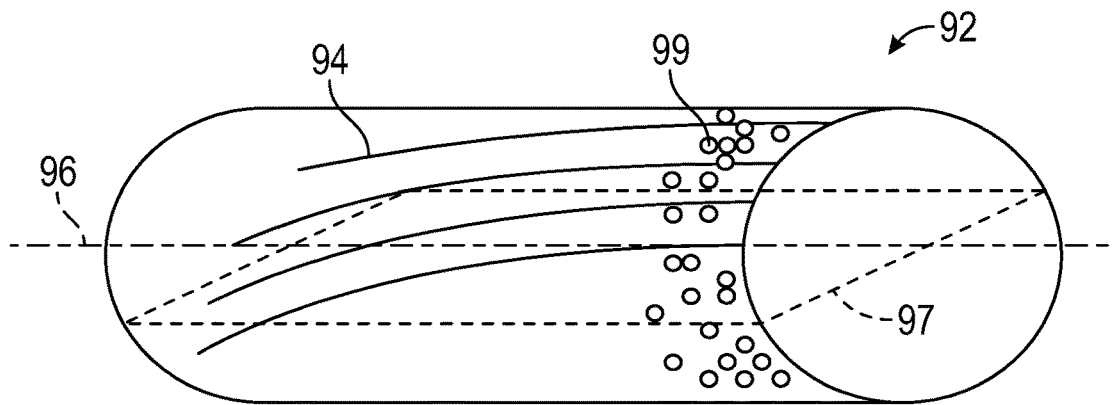

In still another example shown in FIG. 12, a scintillator body 92 has a crystal axis 96 and cleavage plane 97. An additional surface roughening operation has been applied which is isotropic, such as sandblasting or chemical etching, for example, to provide isotropic roughness spots 99. Here again, this may be used to help customize the optical compensation for the given application. It should be noted that, while the above described examples and techniques are shown separately for clarity, various steps and features may be combined in different examples.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A scintillator package comprising:
a scintillator crystal;
a first reflector layer directly surrounding a first area of a surface of the scintillator crystal, wherein the first reflector layer comprises a diffuse reflector, wherein the first reflector layer is less than 1.0 mm thick;
a second reflector layer directly over the first reflector layer, wherein the second reflector layer comprises a metal; and
a non-metallic scintillator package housing directly over the second reflector layer, wherein the scintillator package housing comprises a polymer with a reinforcing material, wherein the scintillator package housing is configured to optically expose a second area of the surface of the scintillator crystal, wherein the scintillator package housing is not hermetically sealed, wherein a front face of the scintillator crystal is exposed at least partially outside of the non-metallic scintillator package housing, wherein an anti-reflective coating is disposed on the front face, and wherein the anti-reflective coating is configured to match an index of refraction of the scintillator crystal to that of a substance coupling the front face to a photomultiplier tube.

2. The scintillator package of claim 1, wherein the scintillator crystal comprises a non-reactive material.

3. The scintillator package of claim 1, wherein the scintillator crystal comprises a non-hygroscopic material.

4. The scintillator package of claim 1, wherein the scintillator crystal comprises YAP.

5. The scintillator package of claim 1, wherein the scintillator crystal comprises surface scratches in at least a partially spiral pattern around the first area of the surface of the scintillator crystal.

6. The scintillator package of claim 1, wherein the first reflector layer comprises a $MgF_2+Al$ reflective coating or a $MgF_2+Al+MgF_2$ reflective coating.

7. The scintillator package of claim 1, wherein the first reflector layer comprises a diffuse reflector layer of less than or equal to approximately 1 mm comprising polytetrafluoroethylene (PTFE).

8. The scintillator package of claim 1, wherein the second reflector material comprises a high-vacuum-rated aluminum foil.

9. The scintillator package of claim 1, wherein the reinforcing material of the polymer of the scintillator package housing comprises glass fill.

10. The scintillator package of claim 9, wherein the glass fill comprises between approximately 20% and 40% of the package housing by weight.

11. The scintillator package of claim 1, wherein the polymer with the reinforcing material of the scintillator package housing comprises a polyamide-imide reinforced with glass fill.

12. The scintillator package of claim 1, wherein the polymer with the reinforcing material of the scintillator package housing comprises PolyEtherEtherKetone (PEEK) reinforced with glass fill.

13. The scintillator package of claim 1, wherein the scintillator package does not include an optical window.

14. The scintillator package of claim 1, comprising a substantially clear sealant over an interface between the scintillator package housing and the exposed second area of the scintillator crystal to prevent contaminants from entering between the first reflector layer and the scintillator crystal, between the second reflector layer and the first reflector layer, or between the scintillator package housing and the second reflector layer.

15. The scintillator package of claim 1, comprising an anti-reflective coating directly over the exposed second area of the surface of the scintillator crystal.

16. The scintillator package of claim 15, wherein the anti-reflective coating is selected to better match an index of refraction of the scintillator crystal to that of a silicone grease used to couple the second area of the surface of the scintillator crystal to a photodetector.

17. A downhole tool, comprising:
a radiation source to emit radiation into a geological formation around the downhole tool;
a radiation detector to detect a signal from the irradiated geological formation;
wherein the radiation detector comprises a scintillator package and a photodetector device, the scintillator package comprising:
a scintillator crystal;
a first reflector layer directly surrounding a first area of a surface of the scintillator crystal, wherein the first reflector layer comprises a diffuse reflector;
a second reflector layer directly over and in contact with the first reflector layer, wherein the second reflector layer comprises a metal;
a non-metallic scintillator package housing directly over the second reflector layer, wherein the package housing comprises a polymer with a reinforcing material, wherein the scintillator package housing is not hermetically sealed, and wherein the scintillator package housing is configured to optically expose a second area of the surface of the scintillator crystal to emit light to the photodetector device without an optical window; and
a clear sealant over an interface between the scintillator package housing and the exposed second area of the scintillator crystal and over the first reflector layer or the second reflector layer, wherein the clear sealant over the interface is configured to prevent contaminants from entering between the first reflector layer and the scintillator crystal, between the second reflector layer and the first reflector layer, between the scintillator package housing and the second reflector layer, or a combination thereof, wherein a front face of the scintillator crystal is exposed at least partially outside of the non-metallic scintillator package housing, wherein an anti-reflective coating is disposed on the front face, and wherein the anti-reflective coating is configured to match an index of refraction of the scintillator crystal to that of a substance coupling the front face to a photomultiplier tube.

18. A radiation detector comprising:

a scintillator crystal;

a first reflector layer directly surrounding a first area of a surface of the scintillator crystal, wherein the first reflector layer comprises a diffuse reflector less than 1.0 mm thick;

a second reflector layer directly over and in contact with the first reflector layer, wherein the second reflector layer comprises a metal;

a non-metallic scintillator package housing directly over the second reflector layer, wherein the scintillator package housing comprises a polymer with a reinforcing material that does not cover a second area of the scintillator, wherein the reinforcing material comprises a glass fill;

a clear sealant over an interface between the scintillator package housing and the exposed second area of the scintillator crystal and over the first reflector layer or the second reflector layer, wherein the clear sealant over the interface is configured to prevent contaminants from entering between the first reflector layer and the scintillator crystal, between the second reflector layer and the first reflector layer, between the scintillator package housing and the second reflector layer, or a combination thereof; and a photodetector device optically coupled to the second area of the scintillator without an intervening optical window, wherein a front face of the scintillator crystal is exposed at least partially outside of the non-metallic scintillator package housing, wherein an anti-reflective coating is disposed on the front face, and wherein the anti-reflective coating is configured to match an index of refraction of the scintillator crystal to that of a substance coupling the front face to a photomultiplier tube of the photodetector device.

* * * * *